Sept. 21, 1965 C. S. GILBERT 3,207,318

PHONOGRAPH RECORD STORAGE APPARATUS

Filed Dec. 31, 1963 2 Sheets-Sheet 1

INVENTOR.
CARL S. GILBERT

BY

ATTORNEY

PHONOGRAPH RECORD STORAGE APPARATUS

Filed Dec. 31, 1963 2 Sheets-Sheet 2

INVENTOR.

CARL S. GILBERT

BY [signature]

ATTORNEY

United States Patent Office 3,207,318
Patented Sept. 21, 1965

3,207,318
PHONOGRAPH RECORD STORAGE APPARATUS

Carl S. Gilbert, 7035 Maynard Ave., Canoga Park, Calif.
Filed Dec. 31, 1963, Ser. No. 334,697
3 Claims. (Cl. 211—40)

This invention relates to equipment used for containing, storing and displaying phonograph records, and more specifically resides in suspensible transparent protective sheaths adapted to receive phonograph records and phonograph record jackets, together with suspension equipment for supporting the sheaths while storing and displaying the records and jackets.

It is common commercial practice to sell and distribute phonograph records in removable cardboard envelopes or jackets. The jacket serves to protect the record in the course of trade and is also utilized for displaying at the outside thereof informative printed matter describing the recording artists and selections recorded on the contained record. The purchaser most often desires to store the jacket together with the record, primarily for the purpose of having the printed matter available, and in many instances using the jacket to protect the delicate record in the absence of any other form of protection.

It is an object of this invention to provide a suspensible sheath for containing photograph records and record jackets.

A recommended method for storing phonograph records requires that the records be stored on end free from lateral stresses. Most records are rapidly warped when unevenly supported in a flat position, and particularly in the presence of heat. It is therefore an object of this invention to provide a sheath for storing phonograph records which is suspensible at its upper side to hold the contents in a vertical position devoid of lateral pressures and stresses.

A further object of this invention is to provide suspensible transparent sheaths for storing phonograph records and record jackets which permit the contents of the sheaths to be viewed without removing the contents from the sheaths.

Another object of this invention to provide a suspensible transparent sheath having twin pockets or envelopes for individually storing a phonograph record and its associated jacket and displaying both the record and the jacket simultaneously.

It is also an object of this invention to provide a horizontally extending member which is arranged to pivot at its one end about a vertical axis while having suspended therefrom transparent sheaths for storing and displaying phonograph records and record jackets.

A further object is to provide suspension equipment for supporting the sheaths at the upper sides thereof to enable the sheaths to hang in a vertical position adjacent to one another.

These and other objects hereinafter set forth will be made more apparent in the following specifications and the specific claims appended hereto.

Referring now to the drawings.

Figures 1, 2:
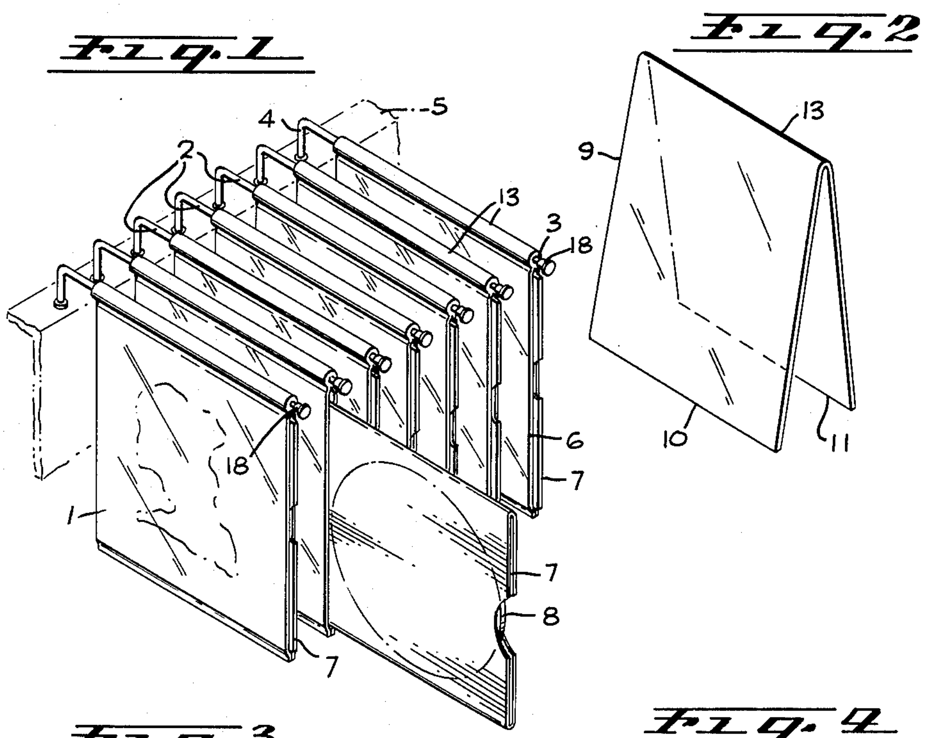
FIG. 1 is a perspective view showing a plurality of record storing sheaths individually suspended from projecting rods, and with a record jacket containing a record partially inserted in one of the sheaths.
FIG. 2 is a perspective view of the folded strip of transparent film from which the sheath is fabricated.
Figures 3, 5:
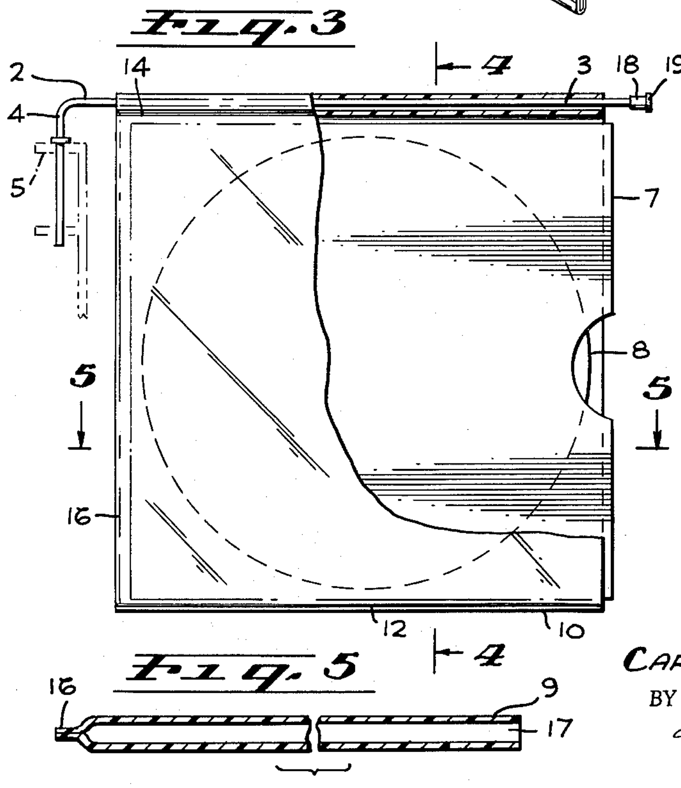
FIG. 3 is a cut-away view of a sheath and supporting equipment with a record jacket containing a record fully inserted therein.
FIG. 5 is a horizontal section on line 5—5 of FIG. 3 with the record jacket and record removed.
Figure 4:
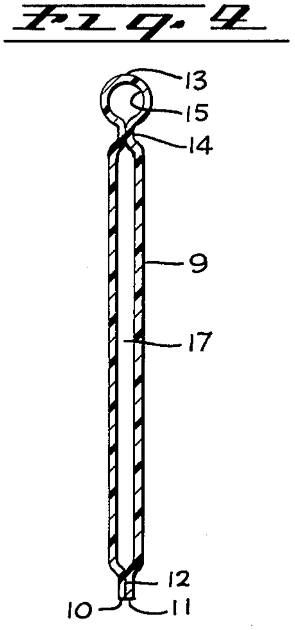
FIG. 4 is a vertical section on line 4—4 of FIG. 3 with the record jacket and record removed.

In the various drawings and specifically FIG. 1, there is illustrated a plurality of transparent plastic sheaths 1 as more fully described hereinafter, each being individually suspended from a horizontally extending rod 2. The rods are preferably constructed of rigid metal or plastic and each is angularly formed with a horizontally extending portion 3 and a vertical extension 4, the latter extension being pivotally supported in a base member 5. Each of the suspended sheaths 1 is arranged with a frontal opening 6 adapted to receive a conventional cardboard phonograph record jacket 7 and phonograph record 8 inserted therein.

The details of one embodiment of sheath 1 are illustrated in FIGS. 2 through 5. The sheath 1 is preferably constructed from a strip 9 of transparent pliant polyethylene plastic film of a width slightly greater than that of the record jacket to be contained in the completed sheath and a length approximating twice the width. It is formed by folding one end 10 of the strip 9 upon its other end 11 and heat sealing or otherwise seaming the adjacent ends as indicated at 12. The fold indicated at 13 constitutes a closed end opposite the seamed ends 10 and 11. A short distance from the fold 13 and parallel therewith is a seam 14 which extends the entire width of the strip 9. Thus, in conjunction with the fold 13 there is created a tubular opening 15 which is suitably sized to snugly receive the horizontal extension 3 of a rod 2. A final seam 16 is made adjacent to one side of the folded strip 9 extending from the seam 12 to the seam 14, thereby forming a side-opening envelope 17 adapted to receive the record jacket 7 and record 8.

In assembly, the tubular opening 15 is slipped over the horizontally extending portion 3 of the rod 2 until the tip of the rod 2 projects beyond the tubular portion of the suspended sheath 1. The vertical extension 4 of the rod 2 is pivotally mounted in a suitable base 5 to permit a side-to-side swinging movement of each of the rods 2, thereby enabling visual examination of both sides of each of the suspended sheaths. For securing the sheath 1 onto the rod 2 there is employed a cap 18 having an enlarged head 19, the cap 18 being arranged to frictionally engage the top end of the rod 2. It is contemplated that the enlarged head 19 of each cap 18 may be particularly marked or embossed to identify the contents of the associated sheath.

An alternative embodiment of the sheath is illustrated in FIGS. 6 through 10. This embodiment provides for individual containment of the record and its associated jacket. It is contemplated that the record jacket, independent of the record, may be permanently stored in one portion of the transparent sheath. The record is stored in another portion of the sheath designed to permit ready removal of the record, and is protected at both sides by the polyethylene material from which the sheath is made. Both the jacket and the record may be viewed through the transparent material from opposite sides of the sheath.

Figures 6, 7, 8, 9, 10:
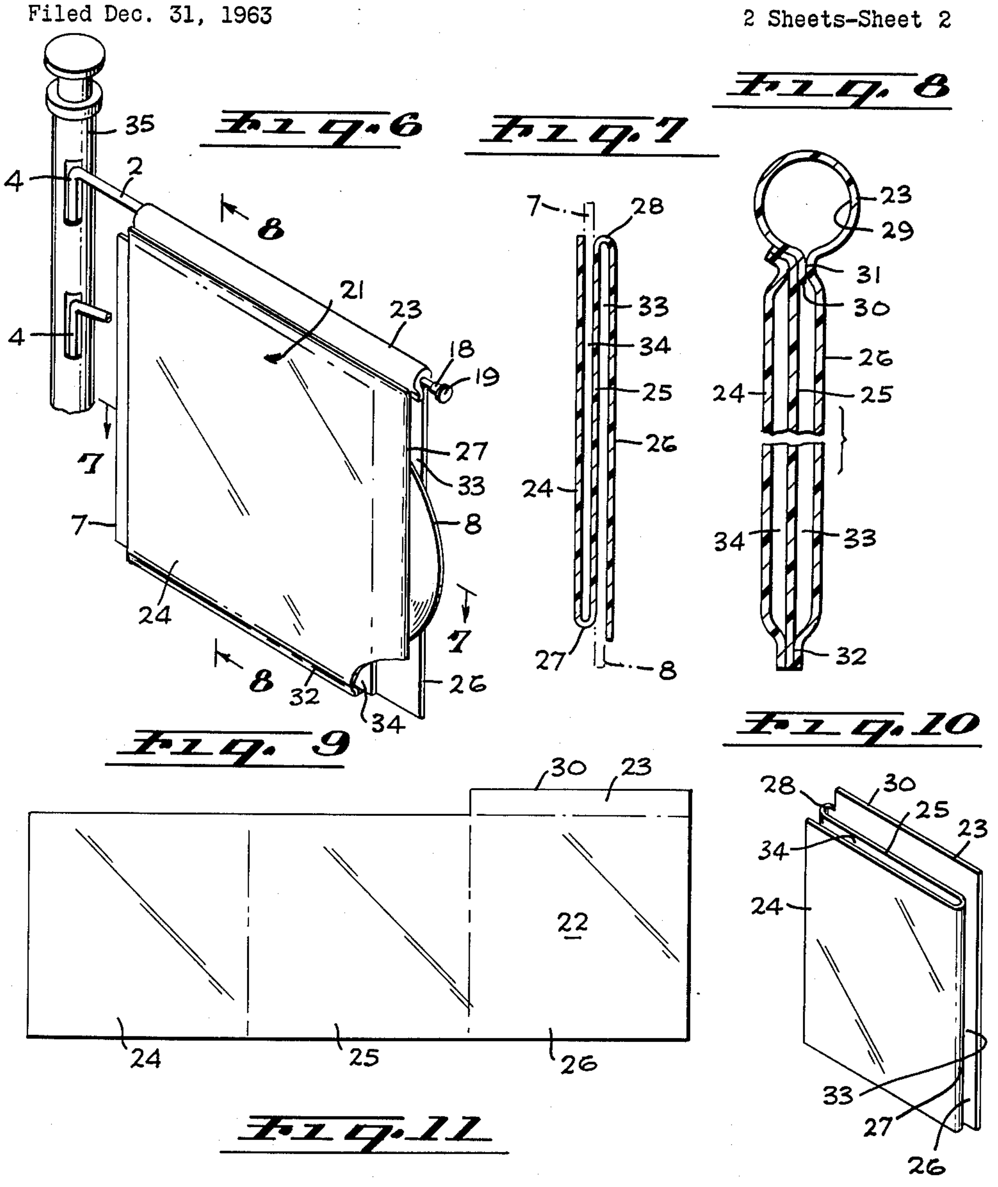
FIG. 6 is a perspective view partially cut away showing another embodiment of the suspended sheath with a record and record jacket individually pocketed and partially inserted therein.
FIG. 7 is a horizontal section on line 7—7 of FIG. 6.
FIG. 8 is a vertical section on line 8—8 of FIG. 6.
FIG. 9 is a plan view of the sheet of transparent material from which the FIG. 6 embodiment of the sheath is produced.
FIG. 10 is a perspective view of the sheath of transparent material as folded for the production of the sheath.

The alternate sheath 21 may be produced from a strip or sheet of thin transparent material of a type already described and generally indicated at 22 in FIG. 9. The sheet 22 is roughly three times its width in length, one-third of the sheet at one end thereof being formed with a projecting flap 23. The sheet 22 is twice folded upon itself, as illustrated in FIG. 10, resulting in three approximately equal sized panels 24, 25 and 26 overlaying one another. One outside panel 24 and center panel 25 are joined by fold 27. Center panel 25 and the other outside panel 26 adjacent to flap 23 are joined by fold 28.

A cylindrical opening 29 is created by folding the edge 30 of projecting flap 23 upon itself and heat sealing or otherwise forming a seam 31 parallel to and adjacent the edges of panels 24, 25, 26 and including the edge 30 of flap 23. A similar seam 32 is formed between panels 24, 25 and 26 parallel to and immediately adjacent the opposite edges thereof. The cylindrical opening 29 is suitably sized to receive the rod 2 in a manner similar to that previously described, enabling the sheath 21 to be suspended from the rod 2. When thus suspended, a side-opening envelope 33 formed between panels 25 and 26 and bounded by seams 31 and 32 and fold 28 is arranged to receive a vertically inserted record 8. Opening at the opposite side of sheath 21 is a side-opening envelope 34 positioned between panels 24 and 25 and bounded by seams 31 and 32 and fold 27. It is contemplated that a record jacket 7 may be separately stored in the envelope 34 and viewed through panel 24.

It is apparent that the sheath as just described may be formed in a variety of different ways. For example, a similar sheath may be formed from a sheet of material of even width and length approximately three times its width by folding the ends over one another to achieve substantially the maximum amount of overlap. One of the folds thus created may then be used to create a tubular opening by seaming parallel and adjacent to the fold as previously described, and appropriately seaming the edges perpendicular to the tubular opening to create adjacent pockets or envelopes.

Figure 11:
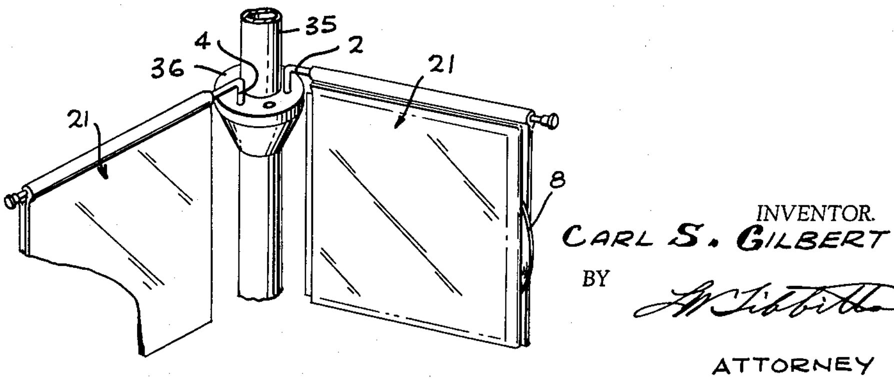
FIG. 11 is a partially broken away perspective view showing another embodiment of supporting equipment for the sheaths.

FIGS. 6 and 11 also illustrate additional means of supporting the rods 2, wherein it is contemplated that the vertically extending portions 4 of rods 2 may be pivotally supported by an upright post 35 and affixed directly to the post 35 or pivotally supported by a collar 36, the latter being either rotatable or fixed with respect to the post 35.

It is recognized that various other embodiments of the invention will properly fall within the spirit and scope of the annexed claims, and it will be obvious that the invention is not restricted to the limited number of embodiments set forth.

What I claim and desire to secure by Letters Patent is:

1. A photograph record storage and display apparatus comprising a rectangular transparent envelope having an opening at one edge thereof to receive a phonograph record or record jacket, a tubular opening along another edge of said envelope at right angles to the first said edge and, a horizontally projecting rod pivotally supported on a support at one end to permit movement about a vertical axis, said rod fitting within said tubular opening to permit suspension of the envelope in a vertical position.

2. A phonograph record and record jacket storage apparatus comprising an envelope having an opening at one edge for insertion of a phonograph record, and a second envelope adjacent one side of the first said envelope, said second envelope having an opening at an edge opposite that of the first said envelope for insertion of the phonograph record jacket, and means at one edge of both of said envelopes for suspending the envelopes in a vertical position.

3. A dual phonograph record and record jacket storage sheath comprising a rectangular envelope for containing a phonograph record, said envelope having an opening at one edge thereof for removable insertion of the record, and a second rectangular envelope attached adjacent one side of the first said envelope for containing a phonograph record jacket, said second envelope having an opening at an edge opposite that of the first envelope to receive the jacket, and a tubular opening along other adjacent edges of both of said envelopes, said tubular opening being adapted to receive a horizontally extending rod to permit suspension of the envelopes in a vertical position.

References Cited by the Examiner

UNITED STATES PATENTS

| | | | |
|---|---|---|---|
| 2,439,584 | 4/48 | Shumann | 229—62 |
| 2,463,450 | 3/49 | Wisner. | |
| 2,777,574 | 1/57 | Brody | 229—55 |
| 2,804,212 | 8/57 | Spitzig | 211—40 |

FOREIGN PATENTS

| | | |
|---|---|---|
| 204,022 | 11/56 | Australia. |
| 634,488 | 1/62 | Canada. |
| 603,864 | 4/60 | Italy. |

JOSEPH R. LECLAIR, *Primary Examiner.*

FRANKLIN T. GARRETT, *Examiner.*